Figure 1:
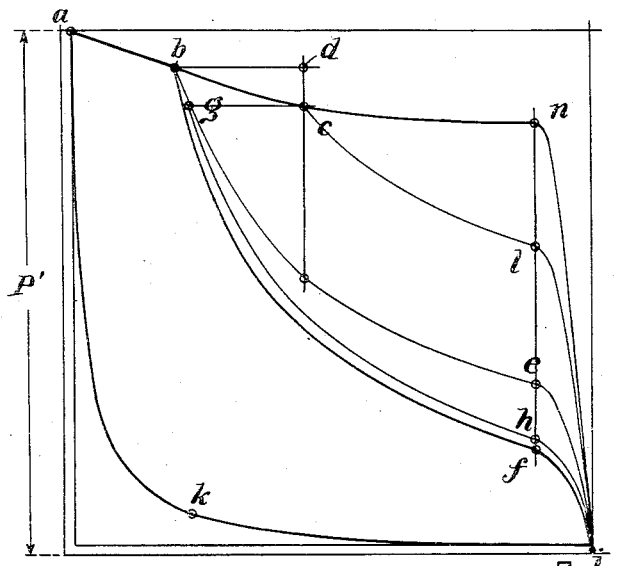

W. SCHMIDT.
ENGINE GOVERNOR WITH AUTOMATIC INLET VALVE.
APPLICATION FILED MAY 7, 1914.

1,167,527.

Patented Jan. 11, 1916.

Witnesses:
George Du Bon
Edmun G Wilbyourns

Inventor:
WILHELM SCHMIDT
By Bresser Knauth
Attorneys

UNITED STATES PATENT OFFICE.

WILHELM SCHMIDT, OF CASSEL-WILHELMSHÖHE, GERMANY, ASSIGNOR TO SCHMIDT'-SCHE HEISSDAMPF-GESELLSCHAFT M. B. H., OF CASSEL-WILHELMSHÖHE, GERMANY, A CORPORATION OF GERMANY.

ENGINE-GOVERNOR WITH AUTOMATIC INLET-VALVE.

1,167,527.  Specification of Letters Patent.  Patented Jan. 11, 1916.

Application filed May 7, 1914. Serial No. 836,859.

*To all whom it may concern:*

Be it known that I, WILHELM SCHMIDT, a subject of the Emperor of Germany, and resident of Cassel-Wilhelmshöhe, Germany, have invented a certain new and useful Improvement in Engine-Governors with Automatic Inlet-Valves, of which the following is a specification.

The structure and operation disclosed in United States patent above referred to, an a modification of and improvement upon that disclosed in my United States Patent for engine governor No. 1,090,417, dated March 17, 1914.

In the governors disclosed in my prior United States patent above referred to, an automatic inlet valve is provided in the cylinder end, and is of such character that it may be opened by compression pressure or other means and closed by reason of the throttling which the steam or other driving means is subjected to while passing through the inlet valve, said throttling increasing with the speed of the piston. This inlet valve is so constructed that, during the time steam is being admitted to the cylinder, there exists an excess force which tends to keep the valve open. This excess force may be provided by placing either the whole or part of the upper side of the inlet valve under less pressure than that of the live steam. Under the above conditions the engine can be regulated by hand or by means of a speed regulator. In order to thus regulate the engine, the amount of live steam admitted may be varied by causing the governor either to influence the force which tends to open the valve, or the throttling in the cross-section of the valve by reason of which the valve is closed. In the latter case the regulator is made to obstruct the lift of the opening and hence the opening cross-section of the valve. If the regulator is to operate by throttling the live steam before passing the inlet valve, then it is made to affect in the usual way a throttling device located in the steam supply pipe; in such case the automatic valve, the proper working of which is not dependent upon any definite pressure of the driving means, works with a constant or nearly constant charge.

In the prior art, where automatic valves have been used in the manner and for the purpose above mentioned, only a single inlet valve has been employed at either end of the cylinder; this has usually been the case, also with mechanically operated inlet valves. Automatic valves thus arranged suffer certain disadvantages. If the valve should be retarded or prevented from closing, as, for example, by a foreign body which has been carried into the valve guide by the driving means; or if oil residues or other accidental causes should keep the valve open, the force tending to close the valve, which force, as above stated, results by reason of the throttling of the incoming steam, must be increased by sufficient added force to overcome the resistance which is holding the valve open. As long as this resistance is comparatively small, it is always possible that the throttling, which increases with the movement of the piston until the latter reaches the middle of its stroke, will become sufficiently great before the mid-stroke position is reached to overcome the resistance and close the valve. In such case the valve will have closed too late, thereby permitting too large an amount of live steam to enter into the cylinder and consequently causing the engine to give too large an output. It is true that the speed regulator will here step in to reduce the charge of live steam by decreasing the force tending to keep the valve open or by trying to move directly the retarded valve; however, the force which this speed regulator is able to set free, or to exercise itself, is necessarily limited. If the limit is reached it may be possible that the throttling, in that position of the piston at which the steam should be shut off in view of the required charge, is still too small to overcome the resistance offered to the closing of the valve, even when the throttling effect is supported by the direct action of the speed regulator. In such case the valve will be closed too late despite the operation of the regulator; or, in other words, the regulation of the engine is not possible. It must be remembered, also, that after the mid-stroke position is reached, the speed of the piston, and hence the throttling of the incoming steam, again diminishes. Hence, if the valve is not closed before this point is reached, it will not be closed until the piston reaches the end of its stroke at which point the cylinder pressure quickly falls in consequence of the opening of the exhaust; this assumes, of course, that the resistance of the valve can be overcome. If, however, the resistance against closure of the valve should be too great, the engine would necessarily work with full cylinder charges; this also means that regulation is impossible.

The above disadvantages are overcome, or at any rate their effect is greatly minimized, in the present invention, according to which, instead of having but a single inlet valve at each cylinder end, there is provided a plurality of correspondingly smaller but identical inlet valves at each end. Since the retarding causes, the effects of which are to be avoided, are the result of accident, it is highly improbable that any retardations would affect, at any one time, more than one valve of the plurality of valves. Hence, where a plurality of valves is employed as in the present invention, only one valve would, at any particular time, require a force greater than normal to close it. This one valve would remain open after the other valves close. Since, however, the inlet cross-section of the one valve is only a fraction of the total inlet cross-section of all the valves, an abnormally high throttling will take place in the valve which remains open, resulting in a corresponding abnormal decrease of pressure in the cylinder. Since this decrease of pressure depends upon the square of the velocity of flow it will be exceedingly large, so that the force needed to overcome the resistance and close the valve will become operative much more quickly than where only a single valve is used.

My invention will be better understood by referring to the accompanying drawings, in which—

Figure 3:
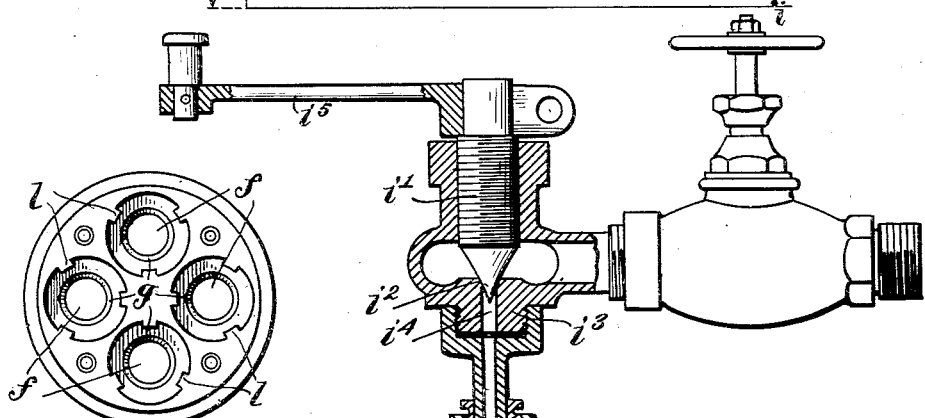
Figure 2:
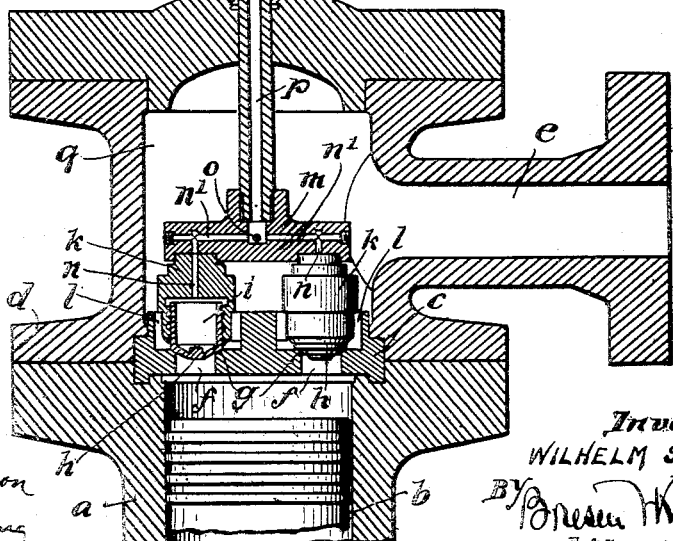

Figure 1 is a steam diagram illustrative of the action of the steam in relation to a valve (Figs. 2 and 3) according to my invention, Fig. 2 is an axial cross-section through one end of an engine cylinder provided with a preferred form of my invention, and Fig. 3 is a plan view from above of the cylinder head containing the valve openings.

In the drawings the cylinder $a$ is assumed to be that of a single acting steam engine having steam admission at one end through a plurality (four in the particular case) of inlet openings $f$ each of which is controlled by a valve $h$. The exhaust takes place through slits or ports (not shown) situated about midway of the cylinder length and is controlled by the piston $b$.

The valves $h$ are disposed annularly in a cylinder head $c$ which is held in place by the flange $d$ of the casing terminating the steam inlet pipe $e$; these valves have the form of cup shaped pistons with thin hollow spaces, $i$, turned away from the cylinder $a$ and rest in valve seats $g$. The valves or pistons $h$ are guided in body portions $k$ which are supported, on the one hand, by ribs $l$ formed in the cylinder head $c$ above the valve seats and are attached, on the other hand, to a common head $m$. The free space between the outer wall of valve $h$ and body $k$ is so chosen that a suitable amount of steam for the operation of the valve may pass through it, after passing between the ribs $l$, to the hollow space $i$. The omission of any packing rings will usually insure this result.

Bores $n$, in the body $k$, connect the spaces $i$ to radial bores $n'$ in head $m$, these bores $n'$, in their turn, converge in a central chamber $o$ from which a pipe $p$ leads to the atmosphere.

A pressure regulator, as set forth in my previously referred to U. S. Patent No. 1,090,417, to be controlled automatically or by hand, is placed in pipe $p$. This comprises a threaded spindle $i'$ provided with a valve cone $i^2$ and a housing $i^3$ provided with a passage $i^4$. The threaded spindle $i'$ has attached thereto an arm $i^5$ controlled by a regulator or, in default thereof, by hand.

The operation of my invention is, broadly, similar to that set forth in the U. S. patent, just spoken of. Steam being admitted by the inlet pipe $e$, and the valves $h$ being preliminarily opened by any suitable means (not shown), will pass through the inlet openings $f$ and force the piston away from the cylinder head $c$. At the same time a certain quantity of steam will pass down between ribs $l$ and up through the free space between valve $h$ and body $k$ into the hollow spaces $i$ and thence through bores $n$, $n'$ and pipe $p$ to the atmosphere. The effective lower surface of each valve $h$ being greater than the effective upper surface and, furthermore, the passages which lead steam into spaces $i$ and thence to the atmosphere being suitably proportioned, the immediate differential effect upon valves $h$ will be to keep them lifted from their valve seats and thus keep the inlets $f$ open. As the piston advances, however, and picks up speed, the steam will be throttled in the openings $f$ and this throttling effect will increase with the speed of the piston. As soon as the pressure in the cylinder is thereby rendered sufficiently lower than that on the upper side of valves $h$ and in the hollow spaces $i$, these valves will close and remain closed during expansion and exhaust. They will also remain closed during a portion of the return stroke and will only open when the compression pressure has become sufficiently great to overcome the pressure on the other or rear side of the valves.

By rotating arm $i^5$ of the pressure regulator the cross section of the passage $i^4$ will be increased or reduced, as the case may be, thereby correspondingly reducing or increasing the pressure on the rear side of the valves and hence varying the time at which the valves will be closed.

By thus using a plurality of inlet valves instead of a single inlet valve at the cylinder end as in my prior patent already referred to, there are brought about very favorable conditions as regards regulation and steam consumption. This is easily seen by reference to the diagram Fig. 1. In this diagram the inlet steam pressure is indicated by $p'$; $a$—$b$ represents the inlet line and the charge of live steam is normally complete at $b$, at which point the inlet pressure is decreased to a value less than that operative on the outer side of the valve so that the valve closes. Where but a single inlet valve is used and resistance to closure occurs, the valve will remain open after the point $b$ is reached and the inlet line will continue on toward the point $c$. The throttling, and correspondingly the force acting to close the valve, steadily increases. At point $c$ this force has been increased by an amount, $c$—$d$. If we assume that the resistance is accurately such that it can be just overcome by the force $c$—$d$, the valve will close at the point $c$, and we shall have the steam diagram $a\ c\ l\ i\ k$. If, however, the single inlet valve is replaced by four separate inlet valves, as shown in Figs. 2 and 3, only one of which is retarded, then the other three will close at the proper time at point $b$ and the inlet line will fall sharply as soon as the point $b$ is reached toward the line $b\ e$ which, in its upper part, is only slightly above the line $b\ f$. If the resistance to closure of the valve is of exactly the same magnitude as above assumed in the case where only a single valve is employed, it is clear that the retarded valve will close at the point $g$ at which point, consequently, normal expansion begins. The resulting steam diagram $a\ b\ g\ h\ i\ k$ differs only slightly from the normal diagram $a\ b\ f\ i\ k$. The diagram also shows that the additional closing force obtained at a certain moment, as a result of the increased throttling, is considerably greater, if one of four valves is retarded, than is the case where but one valve is used and this one valve is retarded. If the piston has reached its greatest speed, this excess force is equal to $d$ in the one case and to $d$—$c$ in the other case. It follows, therefore, that where a plurality of valves is used and one is retarded, considerably greater resistance can be overcome in a given time, than can be overcome in the same time where but a single valve is used and retarded, and it is obvious that the retarded valve of a plurality of valves will be closed very quickly after the other valves are closed, so that no substantial change in the output of the engine can occur.

Where only a single inlet valve is used, and fails to close before the piston has reached mid-stroke position (i. e. position of greatest velocity), a substantial increase in the excess force available for closing the valve is only reached at the exhaust point. (See $a\ c\ n\ i\ k$ of diagram.) In other words, steam enters during the entire travel of the piston and there is no regulation. If, on the contrary, four valves are used of which one is retarded, the excess force tending to close the valve will be considerably increased even after the mid-stroke position has been reached. This clearly follows from the line $a\ b\ g\ e$. In this case, the increase in area of the steam diagram and the output of the engine, even if the retarded valve should not close at all, is still within such limits that the speed regulator can compensate therefor by shortening the time during which the other valves remain open.

An engine provided with a plurality of inlet valves on either side of the piston may be regulated either by use of an automatic speed regulator, by throttling of the driving means, or by hand regulation. At least two valves at either end of the piston must be used according to my invention; an increase in the number of valves with a corresponding decrease of the cross-section of each separate valve as compared with the total inlet cross-section will, however, bring about improved results. And if two or more valves should be retarded at the same time, the beneficial results of the invention will still be apparent as long as there is remaining any valve or valves on the same side of the piston which is not retarded.

As a result of my invention, any defects in the operation of a valve which would cause disturbance in the operation of the engine if only one valve were used, become substantially harmless, inasmuch as the engine remains easily regulatable and its efficiency remains substantially unaffected.

It is not essential to my invention that all the valves of a group should be of the same size. Even though the valves have been built of a different size for some constructive reason, or even though they fail to correspond as a result of manufacturing errors, or even though they should not be uniformly influenced by the speed regulator, they will, nevertheless, close at practically the same time. This results from the fact that, the instant one of the valves is closed, there is an immediate increase in the throttling effect, tending to cause a quicker closure of the remaining valve or valves. In general, however, I prefer to make all the valves of a given group of the same dimensions unless special conditions pertaining to the construction of the engine should make this inadvisable. In arranging the speed regulator also I prefer to have it act upon a single inlet pipe going to all the valves.

Besides the advantages above enumerated the use of a plurality of inlet valves in place of a single inlet valve enables each individual valve to be smaller and thereby capable of being opened and closed by smaller forces. Furthermore any noise caused by the constant playing to and fro of the valve upon its seat is lessened; and, lastly, the valves tend to act with greater promptitude on account of their decreased weights and inertia.

While the invention has been described as applied to single acting steam engines it need not be limited thereto but is equally applicable to double acting engines. In the latter case it is obvious that the inlet valves at the crank end of the cylinder must be arranged to afford sufficient room between the individual valves, for the piston rod and its guiding means. I do not, furthermore, limit my invention to any particular construction of inlet valve.

Having described my invention, I claim:

1. In an engine cylinder provided with a piston, a plurality of similar automatic inlet valves in either cylinder head each of said valves being adapted to be opened by compression pressure and to be closed by the throttling of the incoming steam which is produced by the forwardly moving piston.

2. The combination, with an engine cylinder provided with a piston, an inlet chamber at the end of said cylinder, a plurality of inlets opening from said inlet chamber into said cylinder, and an outlet, of controlling means for said inlet openings said means comprising a plurality of valves corresponding to the plurality of openings, means for leading steam from the inlet chamber to both sides of each valve, and a steam outlet from the outer side of each valve.

3. The combination, with an engine cylinder provided with a piston, an inlet chamber at the end of said cylinder, a plurality of inlets opening from said inlet chamber into said cylinder, and an outlet, of controlling means for said inlet openings said means comprising a plurality of valves corresponding to the plurality of openings, means for leading steam from the inlet chamber to both sides of each valve, a steam outlet from the outer sides of said valves, and means for regulating the steam pressure on said outer sides of said valves.

4. The combination, with an engine cylinder provided with a piston, an inlet chamber at the end of said cylinder, a plurality of inlets opening from said inlet chamber into said cylinder, and an outlet, of controlling means for said inlet openings said means comprising a plurality of valves corresponding to the plurality of openings, means for leading steam from the inlet chamber to the inner sides of said valves, a regulating chamber for each valve in which said valve moves, a contracted passage between said regulating chamber and the inlet chamber, and a steam outlet from the regulating chamber.

5. The combination, with an engine cylinder provided with a piston, an inlet chamber at the end of said cylinder, a plurality of inlets opening from said inlet chamber into said cylinder, and an outlet, of controlling means for said inlet openings said means comprising a plurality of valves corresponding to the plurality of openings, means for leading steam from the inlet chamber to the inner sides of said valves, a regulating chamber for each valve in which said valve moves, the walls of said chamber being spaced from the valve so as to constitute a passage between said regulating chamber and said lower side of the valve, and a steam outlet from the regulating chamber.

6. In combination, an engine cylinder and piston therefor, a plurality of similar automatic inlet valves in either cylinder head, an inlet chamber on the outer side of said head, and a restricted outlet passage leading from the inlet chamber and over the outer side of each valve.

7. In combination, an engine cylinder and piston therefor, a plurality of similar openings through either cylinder head, a valve piston adapted to close the outer end of each opening, a head for guiding each valve piston, an inlet chamber on the outer side of the cylinder end, and a restricted outlet passage leading from the inlet chamber through the guiding head and over the outer side of each valve.

In testimony whereof I have hereunto set my hand in the presence of two subscribing witnesses.

WILHELM SCHMIDT.

Witnesses:
EGMONT KOETTLOFF,
GUSTAV RETTIG.